United States Patent [19]

Biale

[11] Patent Number: 4,885,320

[45] Date of Patent: * Dec. 5, 1989

[54] POLYMERIC OPAQUE PARTICLES AND PROCESS FOR MAKING SAME

[75] Inventor: John Biale, Anaheim, Calif.

[73] Assignee: Union Oil Company of California, Los Angeles, Calif.

[ * ] Notice: The portion of the term of this patent subsequent to May 9, 2006 has been disclaimed.

[21] Appl. No.: 278,050

[22] Filed: Nov. 30, 1988

Related U.S. Application Data

[63] Continuation of Ser. No. 117,681, Nov. 5, 1987, Pat. No. 4,829,102.

[51] Int. Cl.$^4$ .................. C08F 267/06; C08L 51/00
[52] U.S. Cl. .................. 523/201; 524/458; 524/460; 525/291; 525/292; 525/293; 525/295; 525/296; 525/301; 525/303; 525/304; 525/308; 525/902
[58] Field of Search ............... 523/201; 524/458, 460; 525/291, 292, 293, 295, 296, 301, 303, 304, 308, 902

[56] References Cited

U.S. PATENT DOCUMENTS 4,427,836  1/1984  Kowalski .................. 523/201
4,829,102  5/1989  Biale .................. 523/201

*Primary Examiner*—John C. Bleutge
*Assistant Examiner*—David Buttner
*Attorney, Agent, or Firm*—Gregory F. Wirzbicki

[57] ABSTRACT

Polymer opaque particles and a process for making same are disclosed. These particles comprise an emulsion polymerized core copolymer having, as one constituent thereof, between about 15% and about 40% by weight of a monomer having the general formula:

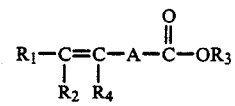

wherein $R_1$, $R_2$ and $R_4$ are independently selected from hydrogen, nitro, amino nitrile, hydroxyl and halogen groups, and organic radicals such as substituted or unsubstituted alkyl, cycloalkyl or aryl groups, $R_3$ is selected from hydrogen or substituted or unsubstituted organic radicals such as alkyl, cycloalkyl or aryl groups and A is an organic or inorganic bridge connecting the illustrated atoms, the remainder being a mixture of selected olefinically unsaturated acid and ester monomers, said core particles, in turn being encapsulated with an emulsion polymerized sheath copolymer comprised of one or more nonionic olefinically unsaturated monomers to produce said opaque particles. In the present invention, the core polymer resulting from the polymerization of the above-described monomer has a structure in which

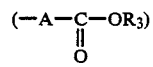

is a pendant functional group.

The finished particles have an average diametric particle size ranging from about 70 to about 4500 nm. and are free of internal microvoids. The present invention further comprises compositions such as paints and paper coatings containing said particles.

53 Claims, No Drawings

POLYMERIC OPAQUE PARTICLES AND PROCESS FOR MAKING SAME

RELATED APPLICATION

This application is a continuation of U.S. patent application Ser. No. 117,168, filed Nov. 5, 1987, now Pat. No. 4,829,102.

FIELD OF THE INVENTION

The present invention relates generally to polymeric opacifying agents used in the production of paints, paper coatings, films and the like and, more particularly, to agents which have a core/sheath structure.

BACKGROUND OF THE INVENTION

Within the past few years, the steady increase in the price of titanium dioxide ($TiO_2$) has created a demand for products capable of replacing all or at least a substantial percentage of the $TiO_2$ needed to opacify paints and other coating compositions. In naturally white products, such as snow, sea foam and flower petals, the whiteness arises from the interaction of light with a multiplicity of interfaces and microvoids therein which randomly scatter incident light within the supporting medium, thus creating the appearance of whiteness. It is known that the introduction of microvoid-containing polymer particles into compositions used for paint, paper coatings and the like perform in a similar manner to cause significant increases in basic composition opacity.

Recently a number of approaches to incorporating such microvoid-containing additives into paint and paper coating formulations have been disclosed. (See "Air and Polymer Extended Paints," Chalmers et al, *European Supplement to Polymer Paint Colour Journal*, Oct. 5, 1983, pp. 94–102.) One of these is the use of solid and/or vesiculated (hollow) polyester/styrene copolymer beads having a size in the range of 3 to 50 microns and marketed under the tradename "Spindrift." A major use of these particles has been to formulate matte paints with good polish resistance. However, unpigmented beads act as windows in the film and are generally used only for highly saturated colors. For cost savings in terms of opacity, the vesiculated bead is most generally used. As sold commercially, these particles are formulated to contain both air and $TiO_2$ within the interior. In use, the particles act to enhance $TiO_2$ efficiency while maintaining film integrity and, with a suitable latex, can achieve very high pigment volume contents (pvc) when counting the particles as a pigment.

In a second approach, aggregates of fine particles are formed by a process of addition polymerization under conditions of high shear in an aqueous medium. This process produces irregular shaped particles (sold under the name "microblock") which the manufacturer claims will produce higher film strengths than do spherical beads. Unlike the vesiculated beads described above, internal pigmentation with $TiO_2$ is not found to be effective and these particles are usually combined with external $TiO_2$ and a film extender to produce high pvc paints which are very flat.

In a third approach, fine particle size non-film-forming polystyrene hollow "beads", in the range of 100 to 600 nm are used. These "beads" have the same order of magnitude size as those of the latex normally used in emulsion paints, with which they are typically blended in a 1:1 ratio. These particles are sold under the tradename of "Plastic Pigment". Careful matching of these particles with the coalescing and other paint constituents is necessary to achieve optimum performance.

Yet a fourth approach involves a suspension of a non-film-forming hollow styrene/acrylic copolymer beads (typically 38% by weight, 52% by volume). As paints containing these beads dry, water, which is lost from the interior voids, is replaced by air. The resulting empty "microvoids" act as light scattering sources, thus increasing the hiding power of the dried film with 4 parts, by volume, of this opaque polymer being approximately equal in hiding power to 1 part of $TiO_2$. The commercially available material, marketed under the tradename "Ropaque", has a uniform particle size of between 400 to 500 nm. In addition to opacifying by scattering incident light, it has been postulated that these particles also contribute to hiding power by uniformly spacing the $TiO_2$ particles and, thus, helping to prevent $TiO_2$ clumping. Further, because these particles have less surface area than the corresponding volumes of $TiO_2$, a reduction in binder demand may be possible. Articles appearing in the literature concerning these products indicate that a reduction of up to about 25% in the $TiO_2$ content in a paint formulation is achievable.

The process for manufacturing these microvoid particles is described in U.S. Pat. Nos. 4,469,825 issued to Kowalski et al. and 4,594,363 issued to Blankenship et al. These disclose the production and use of water insoluble particles made by sequential emulsion polymerization to form a swellable "core" of polymeric acid, which is then at least partially encased with a "sheath" polymer permeable to ammonia or an organic base, such as an amine. Sheath permeability is necessary to allow the base to contact the core. In the disclosed polymer composition, swelling of the core will occur when the acidic polymer is neutralized to a pH of 6 or higher. It is reported that when such particles are so neutralized, they will swell up by about 90–100%, thus causing cracklike microvoids to form in the thus swollen cores. When a paint film containing these particles is allowed to dry, a significant degree of light scattering and, therefore, inherent opacity is reportedly achieved. In so doing, the particles serve as a supplement or replacement of part or all of the pigmentary medium or extenders that would otherwise be required to achieve equivalent hiding power.

In the present invention, I have found that equivalent or even superior degrees of hiding power can be achieved with a core/sheath polymeric structure which requires neither swelling nor the presence of discrete microvoids.

SUMMARY OF THE INVENTION

In accordance with the present invention, a product and a process therefor are disclosed, said process involving the sequential polymerization, in an aqueous medium, of (1) a core comprising a polymer, at least one component thereof being a monomer having the general formula:

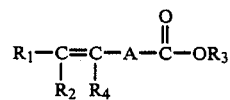

wherein $R_1$, $R_2$, and $R_4$ are independently selected from hydrogen, nitro, amino, nitrile, hydroxyl and halogen groups, and organic radicals, $R_3$ is hydrogen or an organic radical and A is a divalent organic radical linking the illustrated atoms, and (2) a nonionic sheath polymer encapsulating said core, said sheath being capable of interacting with said core to produce a latex of composite particles imparting a high degree of opacity to a suitable carrier. In the present invention, the core polymer resulting from the polymerization of the above described monomer has a structure in which

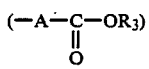

is a pendant functional group.

DETAILED DESCRIPTION OF THE INVENTION (a) General Considerations

The term "sequentially emulsion polymerized" or "sequentially emulsion produced" refers to polymers (said term including both homopolymers and copolymers) which are prepared in an aqueous medium by an emulsion polymerization process wherein the dispersed polymer particles of an initially supplied polymerized "seed" are increased in size. This is typically done by the deposition on the seed of a polymerized product of one or more successive monomer charges introduced into the reaction medium. When no additional emulsifier (or surfactant) is introduced with these charges, essentially no new micelles are formed and substantially all of the added monomer will polymerize onto the "seed" particles. When this is done, the resulting product is commonly known as a "unimodal" sequential polymer and, in the present invention, such a polymeric particle distribution is preferred.

However, seed particles per se are not required to produce core particles. Rather a micelle-forming surfactant can be added either at the beginning of the polymerization reaction or with a subsequently added monomeric charge, after the initiation of polymerization. When this latter procedure is employed, part of the polymer then formed will attach to and be intimately associated with these micelles, yielding a multimodal dispersion having a "dominant" mode comprised of the dispersed polymer particles already present, with a lesser amount of polymer being formed on the micelles. When this is done the dominant mode particles preferably constitute at least 50 percent of the dispersed particle weight. A more preferred embodiment of such a multimodal product is a bimodal copolymer in which the "dominant" or "main" mode particles are derived from initial seed particles and constitute at least about 75 to about 85 percent of the total weight. To achieve this level, surfactant addition should only be after at least 40 to 60 percent by weight of the total amount of monomer to be added has been polymerized onto the seed particles.

(b) Seed

In the present invention, the term "seed" polymer is used to refer to an aqueous polymer dispersion which serves to provide a multiplicity of minute sized particulate nuclei onto which the core polymer is deposited. While, as noted above, seed particles are not required as a constituent of the core structure, their use is preferred as a way of producing a more uniform final product. There are no particular compositional requirements for the seed particles themselves, provided the core composition can polymerize onto them. Further, the seed particles need not be separately supplied. Rather, they may be formed as a first stage of the overall core formation process by adding a micelle forming surfactant to the monomer mixture in an amount sufficient to form a latex containing said multiplicity of minute sized particles. When this is done, it cannot be said, strictly speaking, that a separate seed containing latex is needed to produce final core particles having a composition and particle size distribution as herein below described, and that it can be merely just a first stage in the overall sequential polymerization process of the present invention. Techniques for producing such latex compositions are well known in the art (see, for example, "Emulsion Polymerization" by G. W. Poehlein, Chapter 6 of Applied Polymer Science, 2nd Edition, A C S Symposium Series 285, R. W. Tess and G. W. Poehlein, Editors and Example O(a) of U.S. Pat. No. 4,468,489, both of which are incorporated herein by reference). The main requirement for any particular seed polymer used is that it has a small average diametric particle size distribution, usually in the range of about 30 to about 100 nm and preferably in the range of 40 to 70 nm.

(c) Core Formation

The non-swellable core polymer of the present invention is obtained by the emulsion polymerization of one or more ethylenically unsaturated carboxylic acids or esters thereof, either as a homopolymer or, preferably as a copolymer, with at least one other monomer. As defined herein, "non-swellable" means that the core particles, when treated with an amine base or ammonia, will swell or increase in size by no more than about 15% and preferably less than 10%, in volume.

In its broadest aspect, the acid or ester monomers required in the present invention have the general formula:

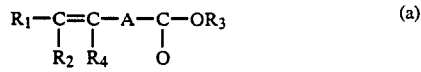

wherein $R_1$, $R_2$ and $R_4$ are independently selected from hydrogen, nitro, amino, nitrile, hydroxyl and halogen groups, and organic radicals, $R_3$ is hydrogen or an organic radical and A is an organic radical, at least 3 atoms long, linking the illustrated atoms. In the present invention, the core polymer resulting from the polymerization of the above described monomer has a structure in which

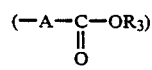

is a pendant functional group.

The term "organic" radical, as used herein, refers to any radical containing at least 1 carbon atom. These radicals may be cyclic or acyclic, have straight or branched chains and can contain one or more hetero atoms such as sulfur, nitrogen, oxygen, phosphorus and the like. Further, they can be substituted with one or more substituents such as thiol, hydroxy, nitro, amino, nitrile and halogen radicals or groups. In addition, the organic radicals may contain aryl groups, such as arylalkyl and alkylaryl groups, but preferably are substituted or unsubstituted aliphatic radicals, and even more preferably, saturated aliphatic radicals, such as straight and branched chain alkyl groups, cycloalkyl groups, alkyl substituted cycloalkyl and cycloalkyl substituted alkyl groups, all of which are preferably unsubstituted with any of the substituents listed herein above. In general, the preferred organic radicals are free of olefinic or alkynyl linkages and, although they must contain at least one carbon atom, they generally have no more than 20, preferably no more than 10, more preferably no more than 7 and most preferably no more than 5 carbon atoms. Preferred for $R_1$, $R_2$, $R_3$ and $R_4$ are hydrogen or unsubstituted alkyl or cycloalkyl groups with hydrogen being most preferred for $R_1$ and $R_2$ and hydrogen or methyl for $R_4$.

In a preferred embodiment, the monomers of (a) further contain a carboxyl group, B, an inorganic bridge, and D, an organic radical, with the resultant monomer being of the general form:

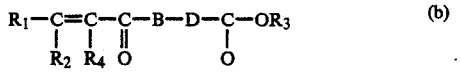
(b)

wherein $R_2$, $R_3$, and $R_4$ are as hereinabove defined, both broadly and preferably, B is either —S—, —O—, or —NR$_6$—, where $R_6$ is hydrogen or an organic radical as herein above broadly defined, but preferably as defined above for $R_3$, and most preferably is hydrogen, and D links B and C.

In a more preferred embodiment, the inorganic bridge of the monomers of (b) is an amide linkage and the resultant monomers have the general formula:

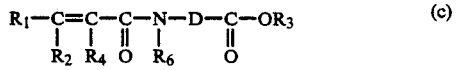
(c)

wherein $R_1$, $R_2$, $R_3$, $R_4$, $R_6$ and D are as defined herein above.

In a most preferred embodiment, the monomers of (c) further contain in D a carbon-oxygen group of the general form:

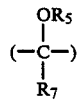

so that the monomers are of the general formula:

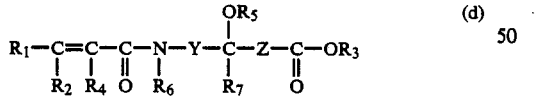
(d)

wherein $R_1$, $R_2$, $R_3$, $R_4$ and $R_6$ are as defined above, $R_5$ is selected from hydrogen and organic radicals as defined above, $R_7$ is as defined above, both broadly and preferably, for $R_1$ and $R_2$, and Y and Z are either organic radicals or, most preferably, covalent bonds between the two illustrated atoms. When Y and Z are organic radicals, they preferably have 1 to about 10 carbon atoms, more preferably between 1 and 7 carbon atoms, and, most preferably between 1 and 5 carbon atoms, are free of olefinic or alkynyl linkages and, when they are cycloalkyl or aryl groups, have only one ring. Still more preferred as organic radicals for Y and Z are aliphatic radicals, preferably straight, saturated aliphatic chains, preferably unsubstituted. In the most preferred embodiment of all $R_1$, $R_2$, $R_6$ and $R_7$ are all hydrogen, $R_3$ is hydrogen or an alkyl or cycloalkyl radical having up to 7 carbon atoms, $R_4$ and $R_5$ are hydrogen or methyl, and Y and Z are covalent bonds.

Among the most preferred monomers, conforming to formula (d) above, are acryloamido acids and esters having the general formula:

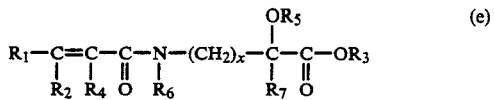
(e)

wherein $R_1$, $R_2$, $R_3$ and $R_7$ are independently selected from hydrogen or an unsubstituted alkyl or cycloalkyl group having up to 7 carbon atoms, $R_4$, $R_5$ and $R_6$ are hydrogen or methyl and X is an integer in the range of from 0 to 4, most preferably 0. Such monomers include acryloamidoglycolic acid, methacryloamidoglycolic acid, acryloamido-2-hydroxypropanoic acid, methacrylamido-2-hydroxypropanoic acid, acryloamido-2-hydroxybutanoic acid, methacryloamido-2-hydroxybutanoic acid, acryloamido-2-hydroxy pentanoic acid, methacryloamido-2-hydroxypentanoic acid, ($C_1$–$C_7$) alkyl and cycloalkyl esters of said acids, and methyl acryloamidoglycolate-methyl ether (MAGME), with acryloamidoglycolic and methacrylamidoglycolic acids and MAGME being the most highly preferred compounds of all.

In regard to the reference to homopolymerization, the present invention is defined to include a core which contains 100 percent of a polymerized monomer conforming to (a), (b), (c), (d) or (e) as defined above. Preferably, however, the core composition is a copolymer. This copolymer may be between two or more different monomers conforming to formulas (a) to (e) but, preferably are one or more of these monomers in combination with one or more "other ethylenically unsaturated" monomers. In the present invention, "other ethylenically unsaturated" monomers is meant to define a class of reactive chemicals which have but one olefinic group, are free of alkynyl and —C≡N— linkages and have no more than one other functionality selected from the class consisting of a carboxylate, sulfonate, phosphonate, amino, nitrile, epoxide or ketonic group. Preferably they have either none of these functionalities or but one carboxylate group of the form:

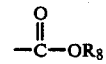

wherein $R_8$ is as broadly defined for $R_3$ in formula (a) above, and, more preferably is a saturated, unsubstituted aliphatic group having no more than 20 carbon atoms. Most preferred are (1) monoethylenically unsaturated acids, such as acrylic acid, methacrylic acid, ethacrylic acid, 2-propyl propenoic acid, 2-butyl propenoic acid, 2-pentyl propenoic acid, 2-hexyl propenoic acid, cyclohexylacrylic acid, chloroacrylic acid, phenylacrylic acid, furylacrylic acid, 2-butenoic acid, 2-ethylhexyl 2-butenoic acid, 2-pentenoic acid, 3-methyl-3-pentenoic acid, acryloxypropionic acid, itaconic acid, maleic acid, fumaric acid and crotonic acid, and (2) nonionic monomers, (i.e. those free of active acid or base functionalities), such as various ($C_1$–$C_{20}$) alkyl esters of the foregoing acids, styrene, vinyl toluene, ethylene, vinyl acetate, vinyl chloride, vinylidene chloride and acrylonitrile and mixtures thereof. In the present invention, a combination of methyl methacrylate (MMA) and butyl acrylate (BA) in a ratio ranging from 3 parts MMA to 10 parts BA, preferably from 4 parts MMA to 8 parts BA and, most preferably, from 5 parts MMA to 6 parts BA has been found to be particularly efficacious.

In general, core copolymers suitable for the purposes of this invention should contain at least 5 percent and, preferably, at least 10 percent by weight of the selected monomer. However, a preferred maximum quantity is about 40 percent of the total core monomer by weight while a preferred minimum is about 15 percent, with a most preferred range being between about 20 and about 30 percent.

It should be noted that, in some cases, the monomers as defined in (d) above are found, to dissociate to some extent in solution. For example, such compounds, when $R_5$ is hydrogen and Y is a covalent bond, can dissociate into an alpha-beta ethylenically unsaturated amide and a keto acid or ester of the forms:

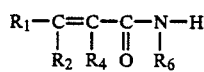

and

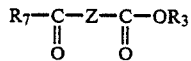

wherein $R_{1-4}$, $R_{6-7}$ and Z are as hereinabove defined. It has been found that where this effect occurs, a stoichiometric mixture of these precursors, when incorporated into the core polymer composition of the present invention, will polymerize or copolymerize to produce finished core particles which are substantially identical in all respects to those produced by the nominal reaction product of (f) and (g) above. For example, acryloamidoglycolic acid has been found to so dissociate and a solution thereof will show observable amounts of its precursors acrylamide,

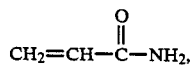

and glyoxylic acid,

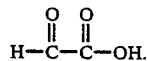

Further, as is shown hereinbelow in Example 6, a solution comprising a stoichiometric mixture of these two materials, when incorporated into the copolymeric composition of the present invention, produces essentially the same results as are obtained when solid, "pure" acryloamidoglycolic acid is used as a starting material. The use of such starting material mixtures, when used as herein described, is considered to be within the scope of the present invention. Further, even in those instances where a given monomer does not so dissociate, a process or product produced from the use of precursor chemicals which, when reacted together, will produce said acid or ester monomer is also considered to be within the scope of the present invention.

The core polymer or copolymer may optionally also comprise, as one component thereof, a small amount of a cross linkable polyethylenically unsaturated monomer such as ethylene glycol diacrylate, allyl acrylate, 1,3-butanediol diacrylate, 1,3-butylene diacrylate, diethylene glycol diacrylate, trimethylol propanetriacrylate or divinyl benzene. The proportion added is usually in the range of 0.01% to about 20%, preferably 0.05% to 10%, and most preferably, 0.1% to 3% by weight, based on the total monomer weight of the core. Such materials tend to produce polymer structures having higher levels of strength and stability than might otherwise be obtained, and the finished particles are better able to resist fracturing during subsequent handling. In the above listing, the reference to acrylate esters should be deemed to include the corresponding methacrylate esters as well.

As is common in aqueous emulsion polymerizations, there is used a water-soluble, free-radical initiator such as hydrogen peroxide, tertbutyl peroxide or an alkali metal (sodium, potassium or lithium) or ammonium persulfate, or a mixture of such an initiator in combination with a reducing agent, such as a sulfite, more specifically an alkali metabisulfite, hydrosulfite, hyposulfite, or sodium formaldehyde sulfoxylate to form a "redox" system. Normally, the amount of initiator used will range from 0.01 to about 2 percent by weight of the monomer charge. In a redox system, a corresponding range (0.01 to about 2 percent) of reducing agent may be used. The temperature may be in the range of about 10° C. to 100° C. When persulfate systems are used, the emulsion temperature is normally in the range of 60° C. to 90° C. In redox systems, the temperature is normally in the range of 30° C. to 70° C., preferably below about 60° C., and more preferably, in the range of 30° C. to 45° C.

In the present invention, a small amount of an emulsifier may also be added. The proportion of emulsifier added, when used, may be as low as about 0.01%, to about 0.5 weight percent based on the weight of the monomer charged. As noted in the discussion of "General Considerations" above, when carrying out a sequential emulsion polymerization with such low levels of emulsifier, the polymer formed subsequently will largely deposit onto the existing dispersed polymer particles resulting from the preceding stage of the process. As a rule, the amount of emulsifier used is kept below the level corresponding to the critical micelle concentration for a particular monomer system to produce an essentially unimodal product although, as noted above, polymodal products can be made, should such a composition be desired. For the purposes of the present invention, any nonionic or anionic emulsifier may be used, either alone or together. Examples of nonionic emulsifiers include tert-octylphenoxyethylpoly(39)-ethoxyethanol and nonylphenoxyethylpoly(40)-ethoxyethanol. Examples of anionic emulsifiers include sodium lauryl sulfate, sodium dodecyl benzene sulfonate, tert octylphenoxyethoxypoly(39)-ethoxyethyl sulfate and the sodium salt thereof.

The molecular weight of the core polymer formed will normally range from about 1 million to about 4 million. If it is desired to produce core polymer compositions having a lower molecular weight, such as from 500,000 down to as low as 20,000, it is most practical to do so by avoiding the use of the cross-linkable polyethylenically unsaturated monomers listed hereinabove and replacing them with a chain transfer agent. Examples of suitable chain transfer agents are lower alkyl mercaptans, such as sec-butyl mercaptan and monothioglycerol. The normal quantity used is in the range of about 0.01% to about 2% thereof, with about 0.05% to about 1% being preferred. Alternatively, higher reaction temperatures, in the range of about 90° to 100° C., may be used.

It has been found that the core particles of the present invention do not need to be swollen to achieve the results herein described. Indeed, as is shown in Example 7 below, the core particles are essentially non-swellable by a base, increasing less than about 10 percent in size after being boiled, at a pH of 10, for 1 hour in an ammonia solution. It is also found that even after such treatment, the core particles are free of microvoids in their interior.

Enough polymer of the above characterized monomeric mixture should be used so that the final core polymer particles, whether obtained by a single stage process or a process involving several stages, will have an average diametric size distribution of between about 50 to about 1,000 nm, preferably, 100 to 500 nm and, most preferably, 150 to 400 nm.

(d) Sheath Formation

After the core particles are formed, one or more subsequent stages of polymerization are then performed to form the sheath polymer and encapsulate the core polymer particles. In this invention, this is done by adding an aqueous suspension of the sheath monomer along with a small amount of initiator to the core latex and continuing the emulsion polyerization reaction as herein above described. This second polymerization reaction may be performed in the same reaction vessel in which the formation of the core was accomplished, and the final product is generally a latex or dispersion of the finished particles.

The particular monomers used to form the sheath polymer may be any of the nonionic monomers mentioned hereinabove, or combinations thereof, for the making of the core. However, methyl methacrylate is preferred, either alone or in admixture with one or more of the highly polar monomers in the list, such as vinyl acetate. The formation of substantial amounts of coagulum or "grit" can be avoided, during the polymerization of the sheath polymer, by the addition to the reaction mixture of up to 10%, and preferably between about 4% and 7% of an alkyl acrylate ester, wherein the alkyl portion has between 1 and about 8 carbon atoms, with butyl acrylate being preferred.

The amount of sheath polymer used to encapsulate the core particles should be sufficient to increase the overall average diametric size of the core/shell composite usually into the range from about 70 to 4500 nm, preferably, from 150 to 3500 nm, and most preferably, from 200 to 2000 nm. The above limitation should not be interpreted to indicate that only one sheath layer or monomer composition may be applied. Rather, more than one sheath layer may be applied, each with a different monomeric composition, and where this is done, such a combination is considered to be within the scope of the present invention.

(e) Opacifier

When mixed in an amount of between about 5% and about 15%, with a suitable latex carrier/binder, it is found that the core/sheath polymer dispersions of the present invention result in compositions which are particularly useful in opacifying latex paint and paper coating formulations, either as supplements to or direct replacements for pigmentary matter, such as titanium dioxide, and/or extenders therefor. For these purposes, the finished aqueous dispersions of the core/sheath polymer particles of the present invention may be used directly in such formulations. Alternatively, the aforesaid dispersion may be dried to produce a free flowing powder that can be packaged, sold and shipped or stored before use. The dried powder can also be used in coatings based on the use of organic solvents, provided, of course, that the sheath copolymer is not soluble therein.

It is not known how the particles of the present invention perform their opacifying function. However, it has been found that the core particles of this invention do not, of themselves, exhibit a significant opacifying capability before the encapsulating sheath polymer is applied (see Example 8 below). As a result, without wishing to be bound thereby, it is postulated that the composite core/sheath polymers of this invention possess a sufficient difference in their indices of refraction, that the combination acts as a light trap for any incident light impinging thereon.

In the following examples which are illustrative of, and not intended to limit, the invention, the parts and percentages are by weight and the temperaturres are in degrees Celsius, unless otherwise stated.

EXAMPLE 1

(a) Core Production

To 170 g of deionized water, which had been heated to 85° C. under a nitrogen purge, was added 0.6 g of sodium persulfate and 10 g of a styrene-butyl acrylate copolymer seed latex having a particle size of about 50 nm. A monomer pre-emulsion mixture comprising 120 g of deionized water, 0.8 g of an emulsifier, 30 g of acryloamido glycolic acid monohydrate, 50 g of methyl methacrylate, 60 g of butyl acrylate and 0.4 g of 1-3 butylene dimethacrylate was prepared and slowly added to the heated seed dispersion. After the pre-emulsion mixture was completely added, the reaction mass was held at 85° C. for an additional 30 minutes, then cooled and filtered. The filtrate had a solids content of 21.62% with an average particle size of about 220 nm.

(b) Sheath Coating 320 g of water was heated to 85° C. under a nitrogen purge after which 0.3 g of sodium persulfate and 22 g of the core product of (a) above were added. To this mixture was added, over a 1 hour period, a mixture of 36 g of methyl methacrylate, and 7.2 g of butyl acrylate, the total mix being held and stirred at 85° C. for an additional hour. After cooling and filtering, the filtrate contained 30.8% solids with an average particle size of 324 nm.

EXAMPLE 2

Ten g of the product of Example 1 were blended with 1.2 g of a commercial vinyl acetate-butyl acrylate copolymer film-forming latex binder and drawn down to produce a 1.5 mm. thick film on a suitable substrate which, after drying, showed a uniform, dense opacity.

EXAMPLE 3

The procedures of Examples 1 and 2 were repeated, but with the acrylamidoglycolic acid being omitted during the preparation of the core product. The dried drawdown film showed much less uniformity and opacity as compared to the film of Example 2.

EXAMPLE 4

The procedures of Examples 1 and 2 were repeated with 11 g of core product using 72 g of methyl methacrylate for the sheath, but with butyl acrylate being omitted. The filtrate had a solids content of 15.8% and an average particle size of about 350 nm. While the drawdown film was uniformly dense and opaque, the volume of coagulum produced was considerably higher than was observed with the composition of Example 1.

EXAMPLE 5

The procedures of Examples 1 and 2 were repeated with 10 g of MAGME being used in place of acrylamidoglycolic acid. The core particle size was about 150 nm with the final core/sheath particle size being about 360 nm. A drawdown sample showed very good, uniform opacity on drying.

EXAMPLE 6

The procedure of Examples 1 and 2 were repeated with 13 g of acrylamide acid, and 14 g of glyoxylic acid being used in place of acryloamido glycolic acid. The core particle size was about 160 nm and the final core/sheath particle size was about 330 nm. A drawdown sample was totally opaque on drying.

EXAMPLE 7

Approximately 100 g of the core product of Example 1 were neutralized with ammonia to a pH of about 10. After boiling the resulting solution for about 1 hour, the particle size observed was about 241 nm.

EXAMPLE 8

The procedures of Examples 1 and 2 were repeated but with 10 g of the unsheathed core particles of (1a) being used in place of the core/sheath particles of (1b). The dried drawdown sample was clear with essentially no opacity.

As stated hereinabove, the use of the core/sheath particles in aqueous coating compositions can serve to increase the hiding power of the pigmented or unpigmented compositions so obtained. Thus, the present invention includes the preparation of aqueous coating compositions comprising the mixing of the aqueous core/sheath polymer dispersions of the present invention with a second aqueous dispersion of a water insoluble particulate material selected from pigments, extenders (e.g., silica, china clays, etc.) and vinyl addition polymers, such as those containing a small amount (e.g., ½ to 3 or even up to about 5 weight percent) of an acid such as acrylic acid, methacrylic acid, and itaconic acid which are film-forming at ambient temperatures, and depositing a film of the composition on a solid substrate to be coated and/or impregnated and subsequently drying the film. Generally, the advantages of the use of the polymer dispersion are noticeable when there is used an amount of core/sheath polymer solids equal to at least 5% by weight of the total solids and the benefits become more pronounced as the proportion of the core/sheath polymer increases to 10% or higher, the most notable effect being observed when the proportion is increased to about 50 percent of the total particulate materials in the film.

The compositions are useful not only in the field of paints, but many other fields. For example, pigmented compositions may be applied to paper to provide coated products of various types. Greaseproof papers may also be so prepared. Compositions may be modified with additional pigments and extenders, with ratios of 4:1 to 30:1 of pigment to binder being best for coating of paper. The papers may be given a high gloss by a mild buffing.

Other interesting applications of dispersions of the compositions of this invention include their use for sealing, priming or coating leather. The dispersions may also be used to improve the abrasion resistance of fabrics and decrease the lint produced therefrom. They are also valuable for preparing pastes for the printing of textiles such as canvas.

Similar compositions are desirable as sealers on felts. They can be applied to cement, stucco, concrete and other porous bodies to seal pores and prevent dusting and flaking.

This invention may be embodied in other specific forms without departing from the spirit or essential characteristics thereof. The present embodiments and examples are, therefore, to be considered in all respects as illustrative and not restrictive, the scope of the invention being indicated by the appended claims, and all changes which come within the scope and equivalency of the claims are, therefore, intended to be embraced therein.

I claim:

1. Water-insoluble opacifying particles comprising polymerized core particles comprises of a polymer having pendant functional groups of the form:

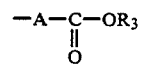

wherein A is an organic bridge at least 5 atoms long and $R_3$ is hydrogen or an organic radical, said core particles being encapsulated with a sheath polymer comprised of one or more ethylenically unsaturated nonionic monomers, said particles being substantially free of microvoids.

2. The particles of claim 1 wherein said sheath polymer comprises a copolymerized monomer mixture comprising between about 93 and about 97 weight percent methyl methacrylate and between about 3 and about 7 weight percent n-butyl acrylate.

3. The particles of claim 1 wherein A comprises a carboxyl group, B and D, said pendant group having the form:

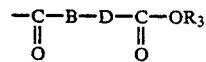

wherein B is —O— or —S—, and D is an organic radical at least 3 atoms long connecting the illustrated atoms.

4. The particles of claim 3 wherein D comprises a group of the form:

wherein $R_5$ is hydrogen or an organic radical, and $R_7$ is selected from hydrogen, nitro, nitrile, hydroxy, halogen and organic radicals with the resultant core polymer having pendant groups of the form:

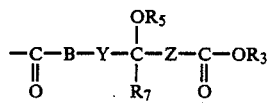

wherein Y and Z are independently selected from organic radicals and covalent bonds, provided that Y and Z combined have at least 2 atoms.

5. The particles of claim 4 wherein Z is a covalent bond and Y is $-(CH_2)_x-$, with X being an integer between 2 and about 10.

6. The particles of claim 5 wherein $R_3$, $R_5$ and $R_7$ are each independently hydrogen or organic radicals free of olefinic and alkynyl linkages, with each of said organic radicals contains no more than about 20 carbon atoms.

7. Non-swellable, microvoid-free opaque particles comprising polymerized core particles comprised of one or more ethylenically unsaturated carboxylic acids or esters, said core particles having a structure in which the polymer has pendant functional groups of the form:

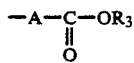

wherein A is an organic bridge at least 3 atoms long and $R_3$ is hydrogen or an organic radical, said core particles further being encapsulated with sheath polymer comprised of one or more ethylenically unsaturated nonionic monomers.

8. A process for making water insoluble opacifying particles comprising sequentially polymerizing a monomer charge comprised of one or more ethylenically unsaturated carboxylic acids or esters thereof of the form:

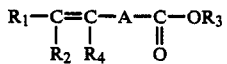

wherein $R_1$, $R_2$ and $R_4$ are independently selected from hydrogen, nitro, nitrile, hydroxyl, halogen and organic radicals, $R_3$ is hydrogen or an organic radical, and A is an organic radical bridge at least 3 atoms long, to form core particles, and then encapsulating said core particles with a sheath polymer comprised of one or more ethylenically unsaturated nonionic monomers, said particles being substantially free of microvoids.

9. The process of claim 8 wherein A comprises a carboxyl group, B, an inorganic bridge between the illustrated atoms and D, an organic radical, said monomer having the form:

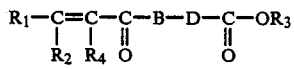

wherein B is $-S-$ or $-O-$, and D links B and C.

10. The process of claim 9 wherein D comprises a group of the general form:

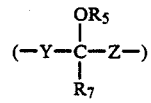

wherein $R_5$ is hydrogen or an organic radical, $R_7$ is as defined for $R_1$ and Y and Z are independently selected from organic radicals and covalent bonds.

11. The process of claim 10 wherein Z is a covalent bond and Y is $-(CH_2)_x-$, with X being an integer in the range of from 0 to 4.

12. The process of claim 10 where said organic radicals are free of olefinic and alkynyl linkages and contain no more than about 20 carbon atoms.

13. The process of claim 11 wherein $R_1$, $R_2$ and $R_7$ are hydrogen, $R_3$ is an unsubstituted cycloalkyl or alkyl group having up to about 7 carbon atoms, $R_4$ and $R_5$ are hydrogen or methyl and X is 0.

14. The process of claim 12 wherein said organic radicals further comprise one or more hetero atoms selected from the class consisting sulfur, oxygen, nitrogen and phosphorus.

15. The process of claim 12 wherein said radicals further comprise one or more substituents selected from the class consisting of thiol, hydroxy, nitro, amino, nitrile or halogen.

16. The process of claim 12 wherein said organic radicals are cyclic radicals selected from the class consisting of substituted and unsubstituted aryl, alkylaryl, arylalkyl, cycloalkyl, alkyl substituted cycloalkyl and cycloalkyl substituted alkyl groups, said radicals having no more than about 10 carbon atoms and only 1 ring.

17. The process of claim 12 wherein said organic radicals are substituted or unsubstituted, saturated, straight or branched chained aliphatic radicals having no more than about 10 carbon atoms.

18. Opaque particles made by the process of claim 8.

19. A paint composition comprising a mixture of between about 5% and about 50%, by weight, of the opacifying particles of claim 18 and a film forming latex comprising one or more pigments, binders and extenders to form a coating composition having a significant level of opacity to incident light.

20. Water insoluble opacifying particles made by the process of claim 8 wherein said monomer charge comprises between 15 and 40 percent, by weight, of a monomer having the form:

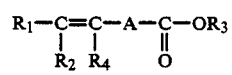

wherein $R_1$, $R_2$, $R_3$, $R_4$ and A are as defined therein, the remainder comprising one or more ethylenically unsaturated monomers selected from the group consisting of (1) acids selected from acrylic acid, methacrylic acid, ethacrylic acid, 2-propyl propenoic acid, 2-butyl propenoic acid, 2-pentyl propenoic acid, 2-hexyl propenoic acid, cyclohexylacrylic acid, chloroacrylic acid, phenylacrylic acid, furylacrylic acid, 2-butenoic acid, 2-ethylhexyl 2-butenoic acid, 2-pentenoic acid, 3-methyl-3-pentenoic acid, acryloxypropionic acid, itaconic acid, maleic acid, fumaric acid and crotonic acid, and (2) nonionic monomers selected from alkyl esters of said acids, with the alkyl component thereof having from 1 to about 20 carbon atoms, styrene, vinyl toluene, ethylene, vinyl acetate, vinyl chloride, vinylidene chloride and acrylonitrile, and mixtures thereof and, when said core particles are encapsulated with said sheath polymer, the composite core/sheath particles have an average diametric particle size in the range between about 200 to about 2000 nm.

21. A paint composition comprising between about 5 and about 50 weight percent of the opacifying particles of claim 20 and a latex film-forming composition comprised of one or more pigments, binders and extenders.

22. The opacifying particles of claim 20 wherein said sheath polymer comprises one or more monomers selected from the group consisting of styrene, vinyl toluene, ethylene, vinyl acetate, vinyl chloride, vinylidene chloride and acrylonitrile, and alkyl esters of acrylic acid, methacrylic acid, ethacrylic acid, 2-propyl propenoic acid, 2-butyl propenoic acid, 2-pentyl propenoic acid, 2-hexyl propenoic acid, cyclohexylacrylic acid, chloroacrylic acid, phenylacrylic acid, furylacrylic acid, 2-butenoic acid, 2-ethylhexyl-2-butenoic acid, 2-pentenoic acid, 3-methyl-3-pentenoic acid, acryloxypropionic acid, itaconic acid, maleic acid, fumaric acid and crotonic acid, with the alkyl component of said ester having from 1 to about 20 carbon atoms, and mixtures thereof.

23. A paint composition comprising a mixture of between about 5 and about 50 weight percent of the opacifying particles of claim 22 and a latex film-forming composition comprised of one or more pigments, binders and extenders.

24. The process of claim 8 wherein said monomer is emulsion polymerized to form said core particles.

25. The opacifying particles of claim 20 wherein $R_3$, when an organic radical, is free of olefinic and alkynyl linkages and contains no more than about 20 carbon atoms, and A is of the following form:

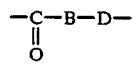

wherein B is —S— or —O—, and D is an organic radical.

26. The opaque particles of claim 25 wherein $R_3$ is hydrogen or a substituted or unsubstituted, straight or branched chain alkyl radical having no more than about 10 carbon atoms, and D comprises a group of the form:

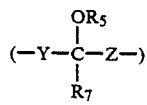

wherein $R_5$ and $R_7$ are hydrogen or organic radicals as defined for $R_3$ and Y and Z are independently selected from organic radicals and covalent bonds.

27. The opaque particles of claim 26 wherein Z is a covalent bond and Y is —$(CH_2)_x$— with X being an integer from 0 to 4.

28. The opaque particles of claim 27 wherein $R_7$ is hydrogen, $R_3$ is an unsubstituted cycloalkyl or alkyl group having up to about 7 carbon atoms, $R_5$ is hydrogen or methyl and X is 0.

29. A paint composition comprising a mixture of between about 5 and about 50 weight percent of the opacifying particles of claim 28 and a latex film-forming composition comprised of one or more pigments, binders and extenders.

30. A paint composition comprising a mixture of between about 5 and about 50 weight percent of the opacifying particles of claim 20 and a latex film-forming composition comprised of one or more pigments, binders and extenders.

31. A process for making water insoluble opacifying particles comprising polymerizing a monomer comprised of one or more ethylenically unsaturated carboxylic acids or esters thereof of the form:

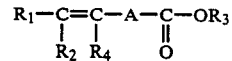

wherein $R_1$, $R_2$ and $R_4$ are independently selected from hydrogen, nitro, nitrile, hydroxyl and halogen groups, and organic radicals, $R_3$ is hydrogen or an organic radical, and A is an organic radical bridge at least 3 atoms long, to form core particles, said polymerization resulting in a polymer having pendant functional groups of the formula:

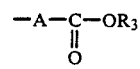

wherein A and $R_3$ are as described above, and encapsulating said core particles with a sheath polymer comprised of one or more ethylenically unsaturated nonionic monomers, said particles being substantially free of microvoids.

32. A paint composition comprising a mixture of between about 5 and about 50 weight percent of the opacifying particles of claim 31 and a latex film-forming composition comprised of one or more pigments, binders and extenders.

33. Opaque particles comprising polymerized core particles comprised of one or more ethylenically unsaturated carboxylic acids or esters thereof of the form:

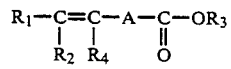

wherein $R_1$, $R_2$ and $R_4$ are independently selected from hydrogen, nitro, nitrile, hydroxyl, halogen and organic radicals, $R_3$ is hydrogen or an organic radical, and A is an organic radical bridge at least 3 atoms long, said core particles further being encapsulated with a sheath polymer comprised of one or more ethylenically unsaturated nonionic monomers, said particles being substantially free of microvoids.

34. A paint composition comprising a mixture of between about 5 and about 50 weight percent of the opacifying particles of claim 33 and a latex film-forming composition comprised of one or more pigments, binders and extenders.

35. A process for making water-insoluble opacifying particles comprising sequentially polymerizing a monomer charge containing one or more ethylenically unsaturated carboxylic acids or esters thereof of the form:

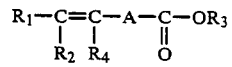

wherein $R_1$, $R_2$ and $R_4$ are independently selected from hydrogen, nitro, nitrile, hydroxyl, halogen and organic radicals, $R_3$ is hydrogen or an organic radical, and A is an organic radical bridge at least 5 atoms long, to form core particles, and then encapsulating said core particles with a sheath polymer comprised of one or more ethylenically unsaturated nonionic monomers, said particles being substantially free of microvoids.

36. A paint composition comprising between about 5 and about 50 weight percent of the opacifying particles of claim 35 and a latex film-forming composition comprised of one or more pigments, binders and extenders.

37. The process of claim 35 wherein the core particles are emulsion polymerized onto a multiplicity of seed particles having an average diametric particle size distribution in the range of between about 30 and about 70 nm to form core particles having a molecular weight distribution from about 20,000 to about 4,000,000 and an essentially unimodal distribution in the range of 50 to 1000 nm.

38. A paint composition comprising between about 5 and about 50 weight percent of the opacifying particles of claim 37 and a latex film-forming composition comprised of one or more pigments, binders and extenders.

39. Water insoluble opacifying particles comprising core particles comprised of one or more polymerized ethylenically unsaturated carboxylic acids or esters thereof of the form:

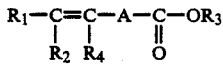

wherein $R_1$, $R_2$ and $R_4$ are independently selected from hydrogen, nitro, nitrile, hydroxyl, halogen and organic radicals, $R_3$ is hydrogen or an organic radical, and A is an organic radical comprising a bridge at least 5 atoms long, and the polymer has pendant functional groups of the form:

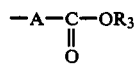

wherein A and $R_3$ are as defined above, said core particles being encapsulated with a sheath polymer comprised of one or more ethylenically unsaturated nonionic monomers, said particles being substantially free of microvoids.

40. A water base latex paint composition comprising a mixture of between about 5 and about 50 weight percent of the opacifying particles of claim 39 and a film-forming composition comprised of one or more pigments, binders and extenders.

41. The particles of claim 39 wherein the core particles are emulsion polymerized onto a multiplicity of seed particles having an average diametric particle size distribution in the range of between about 30 and about 70 nm to form core particles having a molecular weight distribution from about 20,000 to about 4,000,000 and an essentially unimodal distribution in the range of 50 to 1000 nm.

42. The particles of claim 39 wherein said core particles are copolymerized at a temperature of from about 60° C. to about 90° C. in an aqueous medium containing a free radical initiator.

43. A process for making non-swellable, microvoid-free water insoluble opacifying particles comprising sequentially polymerizing a monomer charge comprised of one or more ethylenically unsaturated carboxylic acids or esters thereof of the form:

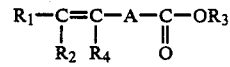

wherein $R_1$, $R_2$, $R_3$ and $R_4$ are independently selected from hydrogen and organic radicals, and A is an organic radical bridge at least 3 atoms long, to form core particles, and then encapsulating said core particles with a sheath polymer comprised of one or more ethylenically unsaturated nonionic monomers.

44. The process of claim 43 wherein the core particles are emulsion polymerized onto a multiplicity of seed particles having an average diametric particle size distribution in the range of between about 30 and about 70 nm to form core particles having a molecular weight distribution from about 20,000 to about 4,000,000 and an essentially unimodal distribution in the range of 50 to 1000 nm.

45. The process of claim 43 wherein said core particles are copolymerized at a temperature of from about 60° C. to about 90° C. in an aqueous medium containing a free radical initiator.

46. The process of claim 43 wherein A comprises a carboxyl group, B, an inorganic bridge between the illustrated atoms and D, an organic radical, said monomer having the form:

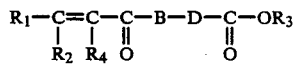

wherein B is —S— or —O—, and D links B and C.

47. The process of claim 46 wherein D comprises a group of the general form:

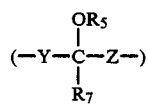

wherein $R_5$ is hydrogen or an organic radical, $R_7$ is as defined for $R_1$ and Y and Z are independently selected from organic radicals and covalent bonds.

48. The process of claim 47 wherein Z is a covalent bond and Y is $-(CH_2)_x-$, with X being an integer in the range of from 0 to 4.

49. The process of claim 48 wherein $R_1$, $R_2$, $R_6$ and $R_7$ are hydrogen, $R_3$ is an unsubstituted cycloalkyl or alkyl group having up to about 7 carbon atoms, $R_4$ and $R_5$ are hydrogen or methyl and X is 0.

50. The process of claim 43 where said organic radicals are free of olefinic and alkynyl linkages and contain no more than about 20 carbon atoms.

51. The process of claim 50 wherein said organic radicals are substituted or unsubstituted, saturated, straight or branched chained aliphatic radicals having no more than about 10 carbon atoms.

52. A process for making non-swellable, microvoid-free water insoluble opacifying particles comprising polymerizing a monomer comprised of one or more ethylenically unsaturated carboxylic acids or esters thereof of the form:

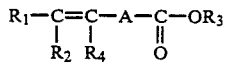

wherein $R_1$, $R_2$ and $R_4$ are independently selected from hydrogen, nitro, nitrile, hydroxyl and halogen groups, and organic radicals, $R_3$ is hydrogen or an organic radical, and A is an organic radical bridge at least 3 atoms long, to form core particles, said polymerization resulting in a polymer having pendant functional groups of the formula:

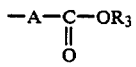

wherein A and $R_3$ are as described above, and encapsulating said core particles with a sheath polymer comprised of one or more ethylenically unsaturated nonionic monomers.

53. Non-swellable, microvoid-free opaque particles comprising polymerized core particles comprised of one or more ethylenically unsaturated carboxylic acids or esters thereof of the form:

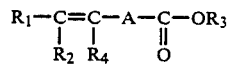

wherein $R_1$, $R_2$, $R_3$ and $R_4$ are independently selected from hydrogen and organic radicals, and A is an organic radical bridge at least 3 atoms long, said core particles further being encapsulated with a sheath polymer comprised of one or more ethylenically unsaturated nonionic monomers.

* * * * *